United States Patent
Balakrishnan et al.

(10) Patent No.: US 10,366,008 B2
(45) Date of Patent: Jul. 30, 2019

(54) TAG AND DATA ORGANIZATION IN LARGE MEMORY CACHES

(71) Applicant: Advanced Micro Devices, Inc., Sunnyvale, CA (US)

(72) Inventors: Ganesh Balakrishnan, Austin, TX (US); Vydhyanathan Kalyanasundharam, Sunnyvale, CA (US); Kevin M. Lepak, Austin, TX (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 270 days.

(21) Appl. No.: 15/376,275

(22) Filed: Dec. 12, 2016

(65) Prior Publication Data
US 2018/0165202 A1 Jun. 14, 2018

(51) Int. Cl.
*G06F 12/08* (2016.01)
*G06F 12/0853* (2016.01)
*G06F 12/0811* (2016.01)
*G06F 12/084* (2016.01)

(52) U.S. Cl.
CPC ........ *G06F 12/0853* (2013.01); *G06F 12/084* (2013.01); *G06F 12/0811* (2013.01); *G06F 2212/283* (2013.01); *G06F 2212/314* (2013.01)

(58) Field of Classification Search
None
See application file for complete search history.

(56) References Cited

U.S. PATENT DOCUMENTS

| | | | | |
|---|---|---|---|---|
| 5,067,078 A | | 11/1991 | Talgam et al. | |
| 5,325,503 A | * | 6/1994 | Stevens | G06F 12/0811 711/146 |
| 5,325,504 A | * | 6/1994 | Tipley | G06F 12/128 711/128 |
| 5,369,753 A | * | 11/1994 | Tipley | G06F 12/0811 711/122 |
| 2002/0085010 A1 | * | 7/2002 | McCormack | G06T 11/40 345/545 |
| 2004/0080512 A1 | * | 4/2004 | McCormack | G06F 12/0215 345/543 |

(Continued)

OTHER PUBLICATIONS

X. Dong, Y. Xie, N. Muralimanohar, and N. P. Jouppi, "Simple but Effective Heterogeneous Main Memory with On-Chip Memory Controller Support," Proc. of the ACM/IEEE Int'l Conf. for High Performance Computing, Networking, Storage and Analysis, pp. 1-11, New Orleans, LA, Nov. 2010.

(Continued)

*Primary Examiner* — Kevin Verbrugge
(74) *Attorney, Agent, or Firm* — Polansky & Associates, P.L.L.C.; Paul J. Polansky; Rosalynn M. Smith

(57) ABSTRACT

A data processing system includes a processor and a cache controller coupled to the processor, and adapted to be coupled to a memory. The cache controller uses the memory to form a pseudo direct mapped cache having a plurality of groups of pages. The memory forms a first number of selected pages, including a first page for storing a plurality of sets of tags and a plurality of remaining pages for storing data. Each tag, of the plurality of sets of tags, stores tags for respective entries in a corresponding one of the plurality of remaining pages.

20 Claims, 5 Drawing Sheets

(56) References Cited

U.S. PATENT DOCUMENTS

2013/0138892 A1   5/2013  Loh et al.
2013/0346695 A1   12/2013 Loh et al.

OTHER PUBLICATIONS

L. Zhao, R. Iyer, R. Illikkal, and D. Newell, "Exploring DRAM Cache Architectures for CMP Server Platforms," Proc. of the 25th Intl. Conf. on Computer Design, pp. 55-62, Oct. 2007.
G. Loh and M. Hill, "Efficiently Enabling Conventional Block Sizes for Very Large Die-stacked DRAM Caches," Micro 11, pp. 454-464, Dec. 2011.
M. Qureshi and G. Loh, "Fundamental Latency Trade-offs in Architecting DRAM Caches," 2012 45th Annual IEEE/ACM International Symposium on Microarchitecture, pp. 235-246, 2012.

* cited by examiner

TAG AND DATA ORGANIZATION IN LARGE MEMORY CACHES

BACKGROUND

A variety of techniques have been developed to increase the overall processing speed of computer systems. Vast improvements in integrated circuit processing technologies have contributed to the ability to increase computer processing speeds and memory capacity, thereby contributing to the overall improved performance of computer systems. The ability to produce integrated circuits with deep sub-micron features enables the number of electrical components, such as capacitors, per integrated circuit to also increase. Emerging technologies, such as 3D-stacked memory, has also led to an exponential increase in the potential memory capacity a computer system can offer. However, the amount of memory devices and the exponentially increasing memory capacities are ineffective if the performance of the device suffers due to an ill-organized cache architecture.

Caches are widely utilized to bridge memory latency and improve performance of a computer system. Today static random-access memory (SRAM) based caches are most commonly used to design last-level caches. However, SRAM is generally expensive in terms of power consumption and circuit area. An alternative to SRAM-based caches is caches built using low-cost memory technologies typically reserved for main memory, including dynamic random-access memory (DRAM), high bandwidth memory (HBM), phase-change memory (PCM), etc. These memory types are capable of high capacities and high overall bandwidths; however, the tradeoff is processing at a high latency.

Figure 1:
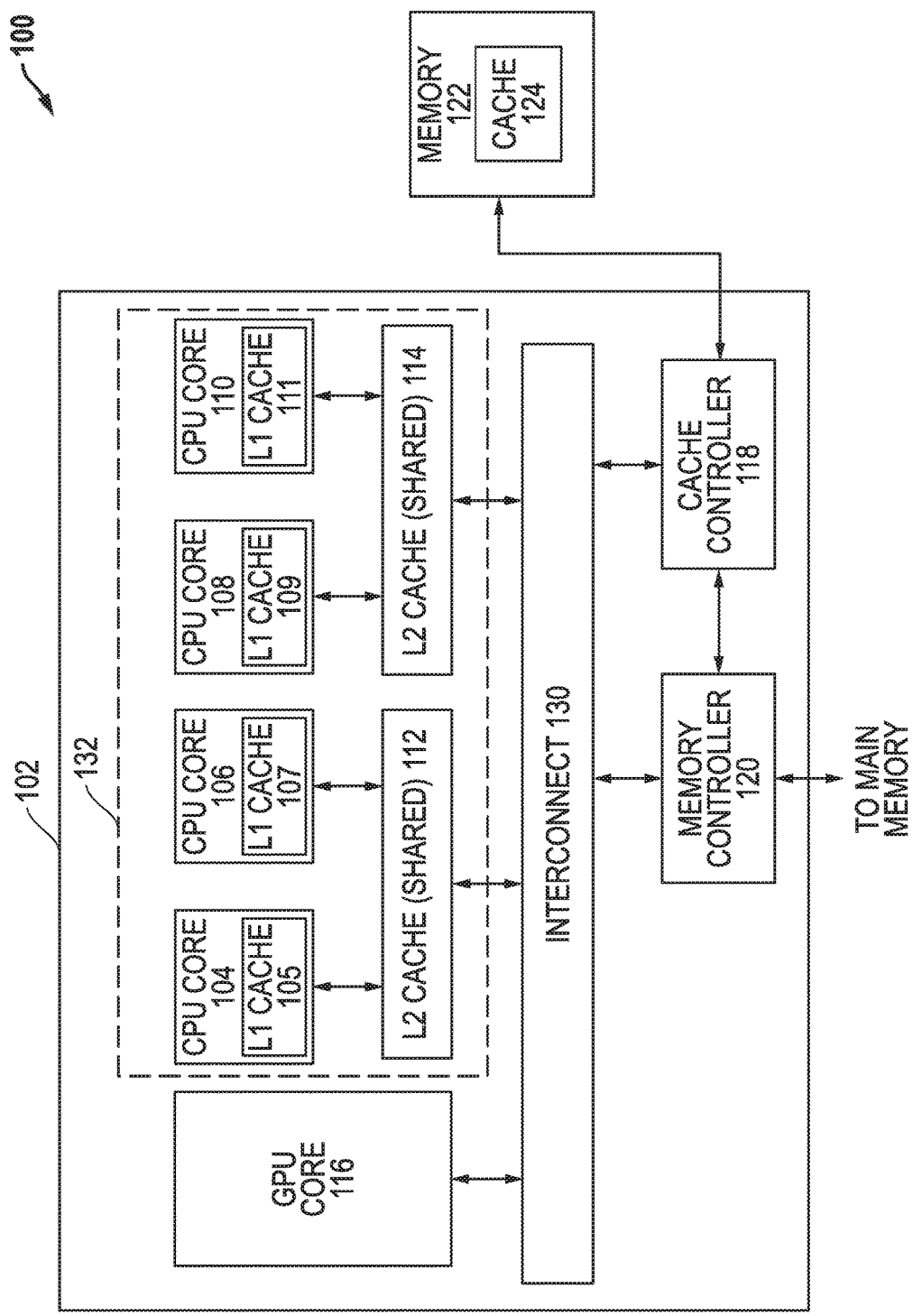
FIG. 1 illustrates in block diagram form a data processing system according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

As will be described below in one form, a data processing system includes a processor, a cache controller coupled to the processor and adapted to be coupled to a memory having a plurality of pages. The cache controller is adapted to use the memory to form a direct mapped cache. Additionally, the cache controller is adapted to store in each page a plurality of direct mapped cache lines. Each page within the memory has a first contiguous area adapted to store data and a second contiguous area adapted to store tags.

In another form, a data processing system includes a processor and a cache controller coupled to the processor, and adapted to be coupled to a memory. The cache controller is adapted to use the memory to form a pseudo direct mapped cache having a plurality of groups of pages. The memory is adapted to form a first number of selected pages, including a first page for storing a plurality of sets of tags and a plurality of remaining pages for storing data. Each tag, of the plurality of sets of tags, stores tags for respective entries in a corresponding one of the plurality of remaining pages.

In yet another form, there is described a method for forming a pseudo direct mapped cache in a memory via a cache controller. The method includes receiving a request to at least one of: generate data to and receive data from a pseudo direct mapped cache having a plurality of groups of pages. A first number of selected pages are formed including a first page for storing a plurality of sets of tags. A plurality of remaining pages is formed for storing data. Each of the plurality of tags stores a tag and metadata for respective entries in a corresponding one of the plurality of remaining pages.

FIG. 1 illustrates in block diagram form a data processing system 100 according to some embodiments. Data processing system 100 includes data processor 102 and memory 122. Data processor 100 generally includes a central processing unit (CPU) core complex 132, a graphics processing unit (GPU) core 116, a cache controller 118, a memory controller 120, and an interconnect 130. CPU core complex 132 includes central processing unit (CPU) cores 104, 106, 108, and 110, each including respective level one (L1) caches 105, 107, 109, and 111. Additionally, CPU core complex 132 includes level two (L2) caches 112 and 114. Data processor 102 operates as the central processing unit of data processing system 100. The memory 122 includes a cache memory 124. All or part of memory 122 implements cache memory 124. Data processor 102 uses cache memory 124 to implement a level 3 (L3) cache.

Interconnect 130 connects CPU core complex 132, GPU core 116, memory controller 120, and cache controller 118. In this example, CPU core complex 132 includes two sets of two CPU cores, but in other embodiments CPU core complex 132 can include an arbitrary number of CPU cores. Each of L2 caches 112 and 114 is bidirectionally connected to interconnect 130, and is capable of providing memory access requests to interconnect 130. Each of CPU cores 104, 106, 108, 110 may be a unitary core, or may further be a core complex with two or more unitary cores sharing certain resources such as L2 caches 112 and 114.

GPU core 116 is a high performance graphics processing unit capable of performing graphics operations such as vertex processing, fragment processing, shading, texture blending, and the like in a highly integrated and parallel fashion. GPU core 116 is bidirectionally connected to interconnect 130, and includes its own cache hierarchy that is capable of providing memory access requests to interconnect 130. Data processor 102 may support either a unified memory architecture in which CPU cores 104, 106, 108, and 110 and GPU core 116 share the same memory space, or a memory architecture in which CPU core complex 132 and GPU core 116 share a portion of the memory space, while GPU core 116 also uses a private graphics memory not accessible by CPU core complex 132.

Interconnect 130 includes a crossbar switch for routing memory access requests and memory responses between any memory accessing agent and memory controller 120. It also implements a system memory map, defined by BIOS, for determining destinations of memory accesses based on the system configuration, as well as buffers for each virtual connection.

Memory controller 120 is connected to and receives memory access requests from a memory accessing agent over interconnect 118. Memory controller 120 is also adapted to connect to a main memory, not shown in FIG. 1.

Cache controller 118 is connected to GPU core 116, memory controller 120, and CPU core complex 132 via interconnect 130. Cache controller 118 is also connected to memory 122 and cache memory 124. In one example, all the components of data processor 102 are combined in a single integrated circuit.

Memory 122 is connected to data processor 102 through cache controller 118 and together cache controller 118 and cache memory 124 form an L3 cache for data processing system 100. All or a portion of memory 122 implements cache memory 124. Memory 122 may be implemented using dynamic random access memory (DRAM), high band width memory (HBM), phase-change memory (PCM), or any similar page-oriented memory. In page-oriented memories, the page is loaded into a high-speed page buffer using an "activate" command. While activate commands add overhead when the memory page is first accessed, subsequent accesses to the same page proceed much more efficiently.

In the example shown in FIG. 1, cache controller 118 includes an integral memory controller. In other examples, data processor 102 includes cache controller 118 and a separate memory controller between cache controller 118 and memory 122.

Figure 2:
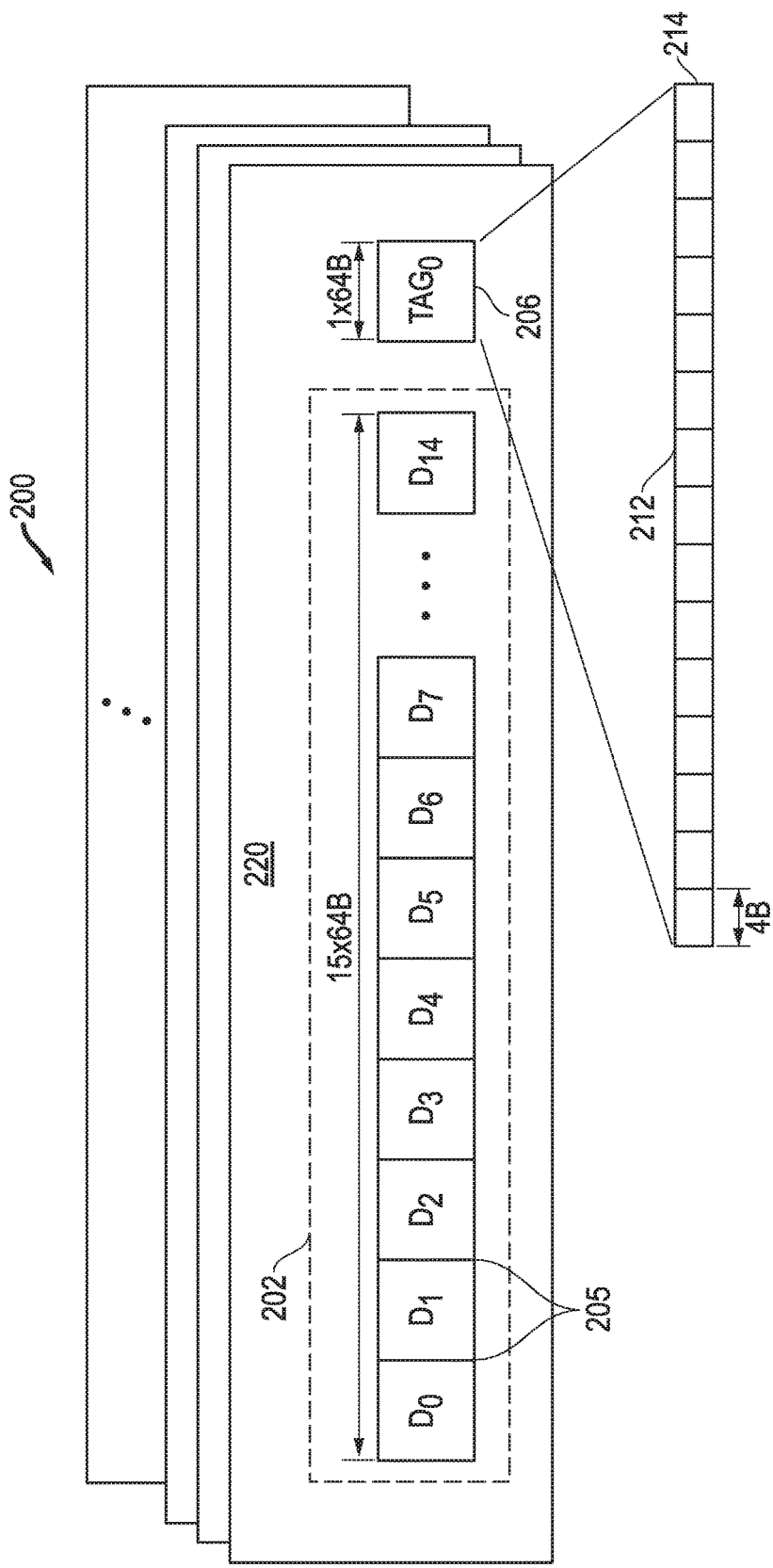
FIG. 2 illustrates in block diagram form a direct mapped cache architecture suitable for use by the data processing system of FIG. 1 according to some embodiments.

FIG. 2 illustrates in block diagram form a direct mapped cache architecture 200 suitable for use in data processing system 100 of FIG. 1. Cache controller 118 implements cache architecture 200 by using a set of memory pages 220 of cache memory 124. Each memory page 220 includes a first contiguous area 202 storing a number of direct mapped cache lines 205, and a second contiguous area 206 storing tag array 214, which is an array of 4-byte (4B) tags 212.

In the illustrated embodiment, each page of memory pages 220 has the capacity to store 15, 64-byte (64 B) of cache lines 205 within first contiguous area 202. Second contiguous area 206 is 64 B in length and has the capacity to store 15 tags 212, leaving only one 4B portion unused. Each tag is 4-bytes in length and stores both the actual tag 212, i.e. a portion of an access address that corresponds to its memory location, and other metadata related to the cache line 205. The metadata includes information such as valid bits, state bits, and owner identification.

Direct mapped cache architecture 200 includes 15 direct mapped cache lines 205 and 15 corresponding tags 212 for each 1 kilobyte (kB) memory page. In another example in which cache memory 124 has 2 kB memory pages, the first contiguous area could include thirty direct mapped cache lines 205. In this example, second contiguous area 206 includes two tag portions, each storing 15 tags 212 with metadata that respectively corresponds to the thirty direct mapped cache lines 205.

In general, data processor 102 issues read and write requests to the memory hierarchy according to stored program instructions. In response to receiving read and write requests from the upper part of the memory hierarchy, cache controller 118 executes a directory lookup to determine whether cache memory 124 currently stores the requested data. Responsively, cache controller 118 decodes the access address to identify that memory page 220 may store the requested data. Cache controller 118 loads each of tags 212 and compares the requested data access address to a selected one of tags 212. If cache controller 118 determines that the access address matches the corresponding tag, the cache access "hits" cache memory 124.

If cache controller 118 determines that the access address does not match the corresponding tag, or the cache line is invalid, the access "misses" cache memory 124. In the case of a "miss" cache controller 118 accesses memory page 220 to allocate the data to one of direct mapped cache lines 205 and the corresponding tag to tag array 214. In the example of a write request, cache controller 118 stores the data within one of direct mapped cache lines 205. Cache controller 118 generates a corresponding tag 212 to store in tag array 214. By storing both the tags and the data in the same memory page, direct mapped cache architecture 200 optimizes the number of times cache access hits cache memory 124.

In one embodiment, cache controller 118 uses modulo arithmetic on the access address to locate the page that stores the tags and thereby the memory location that may store the requested data. In response to a cache lookup request, cache controller 118 locates a direct-mapped location in memory cache 124 and converts the system physical address (SPA) of the cache line to an address in memory 122 using a modulo arithmetic operation. The modulo is equal to a number of cache lines in memory page 220. In the example of FIG. 2, cache controller 118 converts the SPA into the memory address by multiplying the SPA address by 16 and dividing the product by 15, or MemAddr=SPA*16/15. Memory controller 118 locates the tags at the end of the memory page, offset by the offset of the cache line within the page.

Figure 3:
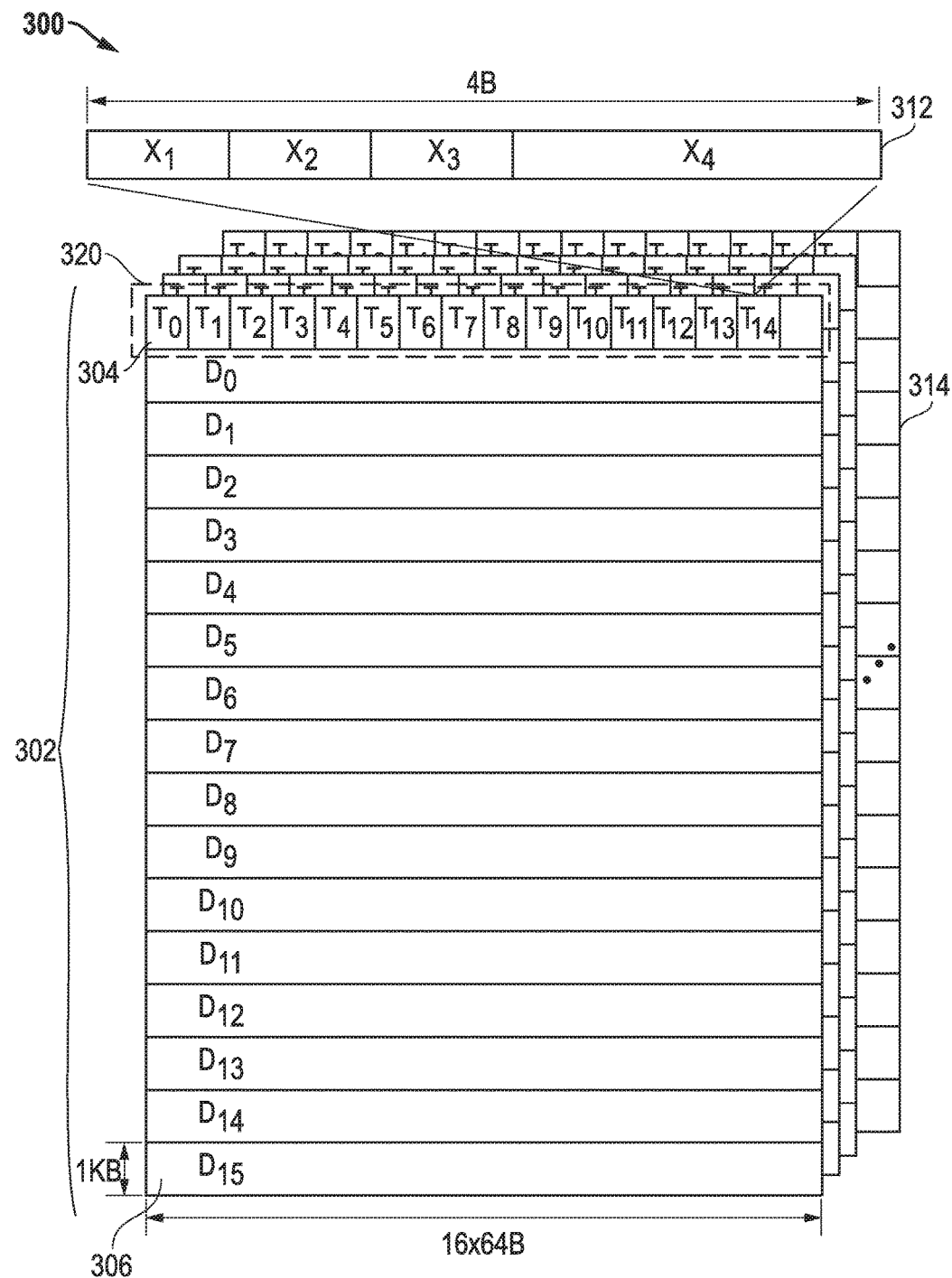
FIG. 3 illustrates in block diagram form a pseudo direct mapped cache architecture suitable for use by the data processing system of FIG. 1 according to some embodiments.

FIG. 3 illustrates in block diagram form a pseudo direct mapped cache architecture 300 suitable for use in data processing system 100 of FIG. 1. Cache controller 118 implements pseudo direct mapped cache architecture 300 using sets of pages within cache memory 124 including a representative set 302. Each set of pages 314 such as set 302 includes 16 pages, including a tag page 320 for storing tags, and a remaining number of data pages such as representative data page 306 for storing cache lines corresponding to the tags.

In the illustrated embodiment, each set of pages 314 has the capacity to store 16 1 KB pages. Each data page such as data page 306 has the capacity to store 1 KB of data made up of 16 64 B cache lines. Tag page 320 has the capacity to store 15 groups of tags 312, leaving only one 64 B portion of tag page 320 unused. Each group of tags stores 16 tags, in which each tag is 4-bytes in length and stores an access address that corresponds to its memory location, and other metadata related to the corresponding cache line within data pages 306.

In operation, cache controller 118 (FIG. 1) receives a memory access request having a SPA from processor 102, through the cache hierarchy. Cache controller 118 converts the SPA to a "memory" address, identifying the bank and respective page associated with the SPA. Cache controller 118 first determines the location of the data, and then determines the location of the group of tags corresponding to the data. It then loads both the group of tags and the corresponding cache line. Cache controller 118 accesses data page 306 and the corresponding tag page 320 as two separate requests. Utilizing the provided SPA, cache controller 118 computes the address offset within the 1 KB data page 306 to obtain the respective cache line access address of the data. If cache controller 118 determines that the address matches the corresponding tag and the cache line is valid, the cache access "hits" cache memory 124. If cache controller 118 determines that the address does not match the corresponding tag or that the cache line is invalid, the access "misses" cache memory 124. In the event of a miss cache controller 118 returns data from main memory.

For example, if the cache memory has a size of 1 gigabyte (1 GB), 16 bits of the SPA select the set of cache lines, 10 bits of the SPA select the offset within the 1 KB page, and the remaining bits of the SPA are hashed to select the cache line in the set containing the data (the effective way). A hashing operation on a 48-bit SPA proceeds using the following operation:

$$\text{WayHash}[7:0] = \text{SPA}[31:24] \char`\^ \text{SPA}[39:32] \char`\^ \text{SPA}[47:40] \quad [1]$$

in which ^ represents the XOR operator, and the bitwise XOR operation is performed on respective bits of the three sets. This hash operation is used to select one of 15 pages, or "ways", and a fixed "way" will be selected based on the hashed address. Since a given SPA determines a single tag and a single data location using effective ways, the organization is pseudo direct mapped. Each way except one will receive 6.64% of the total addressable range, while the remaining one of the 15 ways will receive the remaining 7.03% of the addresses. The way hash operation can be expressed in pseudo-code as follows:

```
case(WayHash[7:0])
    0, 15, 30, . . . 240, 255     : WayNum[3:0] = 4'd1
    0, 15, 30, . . . 241          : WayNum[3:0] = 4'd2
    0, 15, 30, . . . 242          : WayNum[3:0] = 4'd3
    . . .
    0, 15, 30, . . . 254          : WayNum[3:0] = 4'd15
Endcase
EffWayNum[3:0] = (SPA[13:10] = = WayNum[3:0]) ?
4b'0:WayNum[3:0]
```

By hashing the upper address bits to determine an effective way, cache controller 118 can use a set of basic binary logic operations that can be done in hardware and do not require a time-consuming divide operation required by the direct mapped cache architecture of FIG. 2. This organization leaves only 64 B per set of cache lines unused. The cache lines within a 1 KB page are likely to be from the same physical system page although this characteristic is not guaranteed. Moreover, due to the locality of reference, in the best case only a single tag entry lookup is required for every 16 data reads, which limits the tag overhead to about 6%.

Additionally, each set of pages in cache architecture 300 is made up of a cache line from a different bank, so that both the tags and new cache lines that are likely to be subsequently encountered due to the locality of reference will result in fewer page conflicts and lower overhead.

Figure 4:
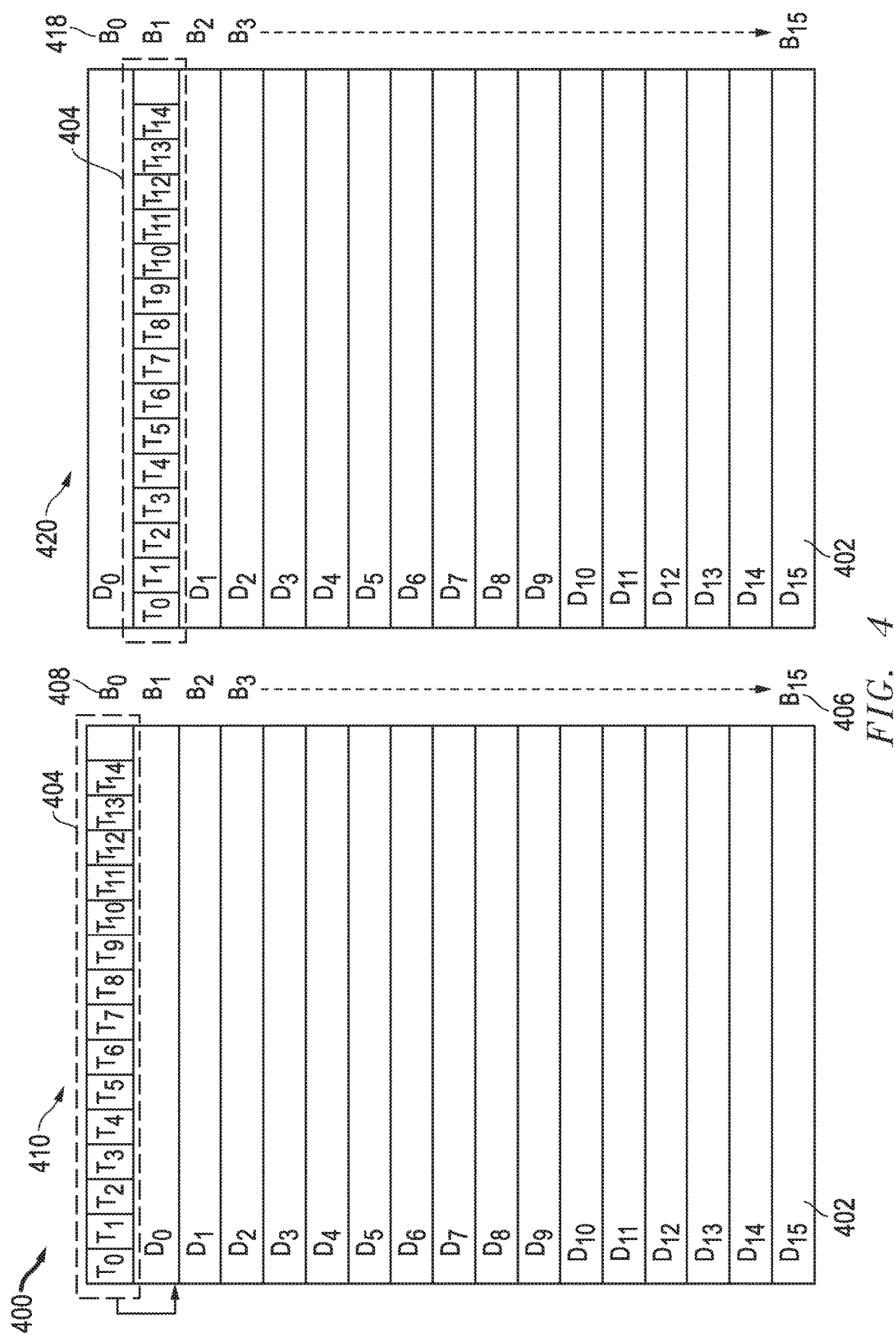
FIG. 4 illustrates in block diagram form another direct mapped cache architecture with bank rotation suitable for use by the data processing system of FIG. 1 according to some embodiments.

FIG. 4 illustrates in block diagram form pseudo-direct mapped cache architecture 400 with a bank rotation suitable for use in data processing system 100 of FIG. 1. The operations of cache architecture 400 are the same as those of cache architecture 300, however cache architecture 300 further illustrates a feature known as bank rotation. Cache controller 118 implements cache architecture 400 by using a sector of pages 410 and 420 within cache memory 124. Each set of pages 410 and 420 include 16 pages, including a tag page 404 for storing tags, and a remaining number of data pages 402 for storing cache lines corresponding to the tags.

Like cache architecture 300, in cache architecture 400 each page in a set of pages such as pages 410 and 420 is mapped to a respective bank 406. All pages within a sector of pages are mapped to a different bank 406. However, between consecutive sets, each tag page 404 within cache architecture 400 is mapped to a different bank. During a write operation memory controller 120 provides a SPA that maps each tag page 404 of a 16 page sector to a separate bank 406. For example, pages 410 includes tag page 404 mapped to first bank 408. A separate sector of pages, pages 420 include a respective tag page 404 mapped to a subsequent bank 418. The memory controller in cache controller 118 calculates memory addresses to rotate the mapped location of each tag page 404 to the subsequent bank to encourage an even distribution of bank accesses. In this way, the tag pages are distributed more evenly among the banks to avoid bottlenecks that would be caused if cache controller 118 had to repeatedly access the tags from a single bank.

Figure 5:
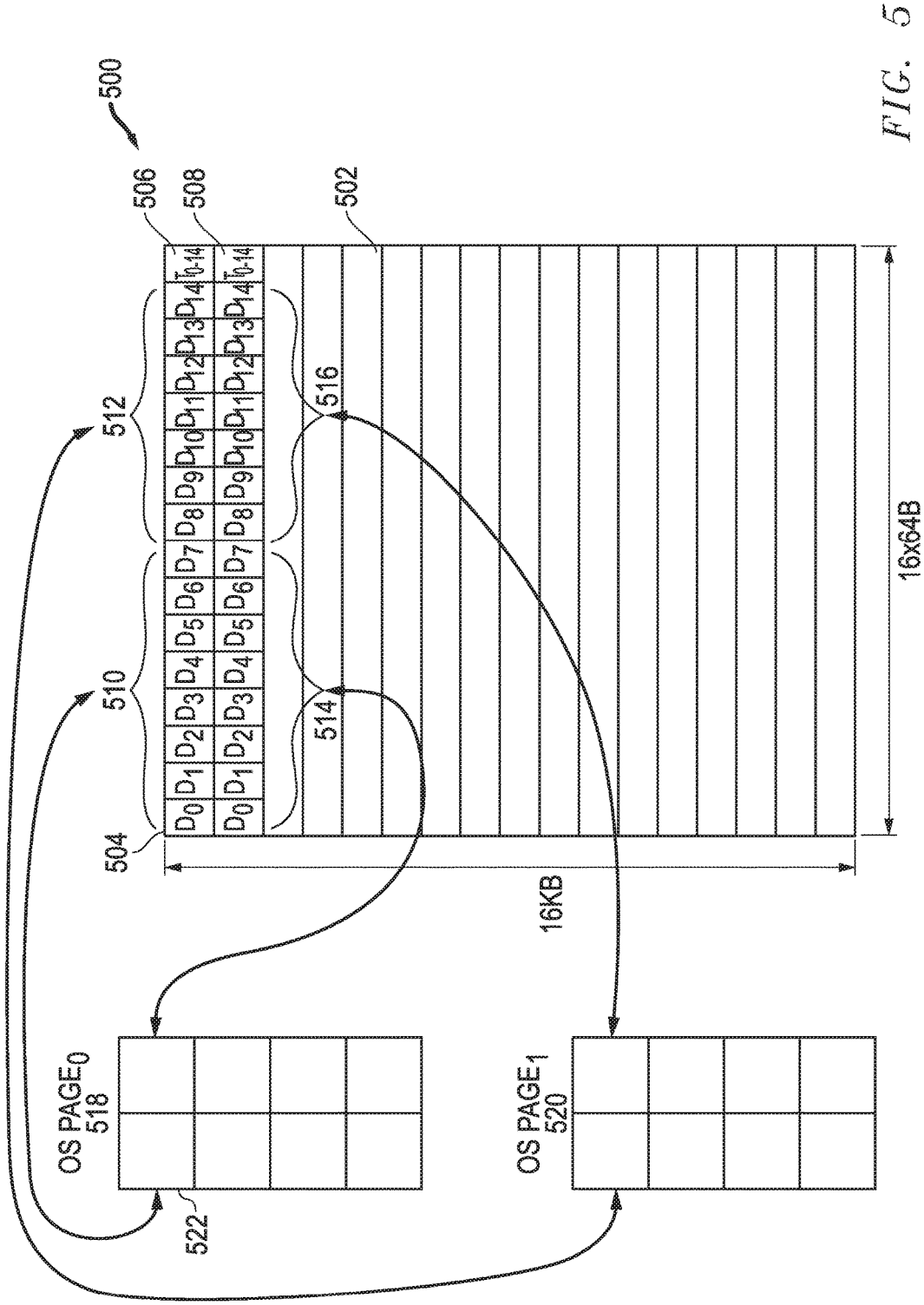
FIG. 5 illustrates in block diagram form another direct mapped cache architecture with multi-page data distribution suitable for use by the data processing system of FIG. 1 according to some embodiments.

FIG. 5 illustrates in block diagram form tag and data collocated pseudo direct mapped cache architecture 500, suitable for use in data processing system 100 of FIG. 1. Cache controller 118 implements tag and data collocated pseudo direct mapped cache architecture 500 using a set of pages 502. Each set of pages 502 includes a first contiguous area 510 and a second contiguous area 512 for storing a number of direct mapped cache lines 504, and a third contiguous area 506 for storing an array of corresponding tags. Cache controller 118 uses memory 122 to form tag and data collocated pseudo direct mapped cache architecture 500 to store data from an operating system (OS) page. The OS retrieves and stores data in equal-size OS page blocks 522 from/to cache memory 124.

In the illustrated embodiment, each page of pages 502 has the capacity to store 16, 64 B cache lines. In first contiguous area 510, cache controller 118 stores data from a first page block of OS page 518. Eight cache lines of data from first page block of OS page 518 are stored in first contiguous area 510. Cache controller 118 stores data from a first OS page block of OS page 520 in second contiguous area 512. An array of tags storing access address information and metadata that corresponds to selected data from both OS page 518 and OS page 520 is stored in third contiguous area 506. Cache controller 118 continues the process of collocating data and tags on a same page for subsequent pages 502. Cache controller 118 stores eight cache lines of data from a second page block of OS page 518 in first contiguous area 514, and seven cache lines of data from the second page block of OS page 520 in second contiguous area 516. Tags corresponding to data from OS page 518 and OS page 520 are collected in a tag array, and stored in third contiguous area 508.

The advantage of tag and data collocated pseudo direct mapped cache architecture 500 is based on the collocation of data and tags within a same page. Accesses are performed on a page basis saving processor overhead. Memory controller 120 receives a SPA and decodes the address to provide a bank, data page, and tag page corresponding to the requested data to cache controller 118. Without causing a page conflict, cache controller 118 loads the requested cache line and the corresponding tag from a same page. Loading data and tags from the same page in a single burst cycle increases the efficiency of data accesses for processor 102.

In one embodiment, OS page data from contiguous page blocks is distributed among multiple pages. Each of pages 502 is located in a different memory bank. Cache controller 118 further mitigates latency by loading tags in parallel across memory banks, and can simultaneously load data from locations across separate memory banks. Tag and data collocated pseudo direct mapped cache architecture 500 increases the efficiency in which cache controller 118 can perform accesses to data since the data and tags are collocated in the same page and multiple pages can be accessed across parallel banks.

The methods and functional blocks described herein may be implemented with various combinations of hardware and software. For example, cache controller 118 may be implemented partly using hardware circuitry and partly using stored program or micro-coded operations. This hardware circuitry may include priority encoders, finite state machines, programmable logic arrays (PLAs), and the like. Some of the software components may be stored in a computer readable storage medium for execution by at least one processor. Moreover, some or all of the methods and techniques described herein may be governed by instructions that are stored in a computer readable storage medium and that are executed by at least one processor. Each of the operations may correspond to instructions stored in a non-transitory computer memory or computer readable storage medium. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Data processor 102 of FIG. 1 or any portion thereof may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist includes a set of gates that also represent the functionality of the hardware comprising integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. It will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Accordingly, it is intended by the appended claims to cover modifications of the disclosed embodiments that fall within the scope of the disclosed embodiments.

What is claimed is:

1. A data processing system, comprising:
  a processor for issuing read and write accesses by providing for each access an access address;
  a cache controller coupled to the processor and adapted to:
    be coupled to a memory having a plurality of pages;
    use the memory to form a direct mapped cache; and
    store in each page a plurality of direct mapped cache lines; and
  each page having a first contiguous area adapted to store data and a second contiguous area adapted to store tags, wherein the cache controller locates a direct-mapped memory location in the memory by converting the access address to an address in the memory using modulo arithmetic.

2. The data processing system of claim 1, wherein:
  the second contiguous area further stores metadata for each of the plurality of direct mapped cache lines in the first contiguous area; and
  the metadata comprises cache line state information.

3. The data processing system of claim 1, wherein the first contiguous area further stores a number of data elements.

4. The data processing system of claim 1, wherein in response to a first cache lookup, the cache controller loads both the tags indicated by the access address and at least one data element before determining an action.

5. The data processing system of claim 1, wherein the cache controller is coupled to the memory through a memory controller.

6. The data processing system of claim 5, wherein the memory controller is capable of accessing a data element and an associated tag element in a single transaction.

7. The data processing system of claim 1, wherein in response to a cache lookup, the cache controller locates the direct-mapped memory location by performing the modulo arithmetic on a portion of the access address using a modulo equal to a number of cache lines in each page.

8. A data processing system, comprising:
  a processor; and
  a cache controller coupled to the processor and adapted to:
    be coupled to a memory having a plurality of banks, each having a plurality of pages;
    use the memory to form a pseudo direct-mapped cache having a plurality of sets of pages, each set having a predetermined number of pages, wherein the cache controller stores each page in a set in a different one of the plurality of banks of the memory; and
    form a first number of selected pages including a first page for storing a plurality of sets of tags and a plurality of remaining pages for storing data, wherein each tag stores tags for respective entries in a corresponding one of the plurality of remaining pages.

9. The data processing system of claim 8, wherein the cache controller is adapted to store metadata for a respective cache line with each of the plurality of sets of tags in the first page.

10. The data processing system of claim 9, wherein the metadata comprises cache line state information.

11. The data processing system of claim 8, wherein each of the plurality of sets of tags in the first page stores a first portion of an access address.

12. The data processing system of claim 8, wherein in response to a cache lookup associated with the first number of selected pages, the cache controller loads an access address associated with each of the plurality of sets of tags.

13. The data processing system of claim 12, wherein in response to the cache lookup, the cache controller further selectively accesses a corresponding data element.

14. The data processing system of claim 8, wherein the cache controller is coupled to the memory through a memory controller.

15. The data processing system of claim 14, wherein the memory controller is capable of accessing a corresponding data element in one burst cycle.

16. The data processing system of claim 8, wherein the processor and the cache controller are combined in a single integrated circuit.

17. A method for forming a pseudo direct-mapped cache in a memory having a plurality of banks via a cache controller, the method comprising:

receiving a request to at least one of: generate data to and receive data from the pseudo direct-mapped cache having a plurality of sets of pages; and forming a first set of selected pages including a first page for storing a plurality of tags and a plurality of remaining pages for storing data, wherein each of the plurality of tags stores an access address and metadata for a respective entry in a corresponding one of the plurality of remaining pages, wherein the forming the first set of selected pages comprises storing each page in the first set of selected pages in a different one of the plurality of banks of the memory.

18. The method of claim 17, further comprising:

wherein the forming the first set of selected pages and the plurality of remaining pages further comprises between consecutive sets, mapping the first page to different banks.

19. A method for forming a direct-mapped cache using a cache controller and a memory, the method comprising:

forming a plurality of sets of pages in the memory in which each set has a predetermined number of pages and each page has a first contiguous area adapted to store data and a second contiguous area adapted to store tags for the data;

receiving a memory access to a data element by the cache controller, the memory access having an access address; and locating the data element in the direct-mapped cache by converting the access address to a location in the memory using modulo arithmetic;

accessing a tag corresponding at the location of the memory access in the memory; and selectively accessing the data element in the location if the tag indicates that the memory access hits the direct-mapped cache.

20. The method of claim 19, wherein the first contiguous area stores a plurality of data elements and the second contiguous area stores tags for corresponding ones of the plurality of data elements, wherein:

the converting comprises performing the modulo arithmetic on a portion of the access address using a modulo equal to a number of cache lines in each page.

* * * * *